United States Patent
Haj-Maharsi et al.

(10) Patent No.: US 8,013,702 B2
(45) Date of Patent: Sep. 6, 2011

(54) VERSATILE DISTRIBUTION TRANSFORMER

(75) Inventors: Mohamed Y. Haj-Maharsi, Houston, TX (US); Thomas J. Lanoue, Cary, NC (US)

(73) Assignee: ABB Research Ltd., Zurich (CH)

( * ) Notice: Subject to any disclaimer, the term of this patent is extended or adjusted under 35 U.S.C. 154(b) by 0 days.

(21) Appl. No.: 12/813,983

(22) Filed: Jun. 11, 2010

(65) Prior Publication Data

US 2010/0315190 A1 Dec. 16, 2010

Related U.S. Application Data

(60) Provisional application No. 61/186,140, filed on Jun. 11, 2009.

(51) Int. Cl.
*H01F 30/12* (2006.01)
*H01F 27/02* (2006.01)
*H01J 5/00* (2006.01)
*H01H 7/04* (2006.01)

(52) U.S. Cl. .......... 336/12; 336/5; 336/90; 336/59; 174/50; 361/38; 361/36

(58) Field of Classification Search ............ 336/12, 336/5, 55, 57, 58, 90, 59, 65, 94; 174/50, 174/520; 361/38, 36
See application file for complete search history.

(56) References Cited

U.S. PATENT DOCUMENTS

| | | | |
|---|---|---|---|
| 3,634,798 A * | 1/1972 | Astleford et al. | 336/92 |
| 3,636,798 A * | 1/1972 | Van Dalen et al. | 30/90.1 |
| 3,668,351 A | 6/1972 | Walbrun et al. | |
| 4,772,999 A | 9/1988 | Fiorina et al. | |
| 4,901,182 A * | 2/1990 | Book | 361/38 |
| 5,170,336 A | 12/1992 | Getter et al. | |
| 5,321,379 A * | 6/1994 | Martin et al. | 336/90 |
| 5,329,222 A | 7/1994 | Gyugyi et al. | |
| 5,514,915 A | 5/1996 | Kim et al. | |
| 5,726,617 A * | 3/1998 | Pla et al. | 336/100 |
| 6,130,524 A | 10/2000 | Stemmler | |

(Continued)

FOREIGN PATENT DOCUMENTS

EP 0757365 5/1997

(Continued)

OTHER PUBLICATIONS

E.C. Aeloiza, Next Generation Distribution Transformer: To Address Power Quality for Critical Loads, IEEE, 2003.

*Primary Examiner* — Anh Mai
(74) *Attorney, Agent, or Firm* — Paul R. Katterle

(57) ABSTRACT

A versatile distribution transformer having an electromagnetic transformer and a power electronic module is provided. A pocket having connectors electrically connected to at least one winding structure of the electromagnetic transformer is mounted above the electromagnetic transformer. The power electronic module is removably mounted in a cavity of the pocket. The power electronic module includes a plurality of semiconductor switching devices and a plurality of connectors adapted to slidably engage the connectors of the pocket. The power electronic module is movable between a removed position, wherein the power electronic module is located outside the pocket, and an installed position, wherein the power electronic module is disposed in the cavity of the pocket and the connectors of the power electronic module engage the connectors of the pocket so as to electrically connect the power electronic module to the at least one winding structure.

20 Claims, 15 Drawing Sheets

U.S. PATENT DOCUMENTS

| | | | |
|---|---|---|---|
| 6,147,581 A * | 11/2000 | Rancourt et al. | 336/65 |
| 6,545,453 B2 | 4/2003 | Glinkowski et al. | |
| 6,867,364 B2 * | 3/2005 | Hafskjold et al. | 174/50 |
| 6,909,349 B1 * | 6/2005 | Longardner et al. | 336/60 |
| 6,914,195 B2 * | 7/2005 | Archambault et al. | 174/160 |
| 6,987,331 B2 | 1/2006 | Koeppe et al. | |
| 7,397,653 B2 | 7/2008 | Taylor | |
| 7,843,298 B2 * | 11/2010 | Hosokawa et al. | 336/90 |
| 2003/0168232 A1 * | 9/2003 | Wiebe et al. | 174/50 |
| 2005/0040924 A1 | 2/2005 | LaBoube et al. | |
| 2005/0111245 A1 | 5/2005 | Lai et al. | |
| 2006/0120001 A1 * | 6/2006 | Weber et al. | 361/103 |
| 2008/0164966 A1 * | 7/2008 | Findeisen | 336/57 |
| 2008/0186641 A1 * | 8/2008 | Wakchaure | 361/36 |

FOREIGN PATENT DOCUMENTS

| | | |
|---|---|---|
| GB | 584818 | 1/1947 |
| WO | WO2010144805 | 12/2010 |

* cited by examiner

VERSATILE DISTRIBUTION TRANSFORMER

CROSS-REFERENCE TO RELATED APPLICATION

This application claims the benefit of U.S. provisional patent application Ser. No. 61/186,140 filed on Jun. 11, 2009, which is hereby incorporated by reference in its entirety.

BACKGROUND OF THE INVENTION

This invention relates to transformers and more particularly to a versatile distribution transformer utilizing power electronics.

Modern society's movement into the digital age is necessitating the development of a more reliable supply of high-quality electricity. An indispensible component in the supply of electricity to end-users is a distribution transformer. A conventional distribution transformer converts electricity at one voltage to electricity at another voltage, either of higher or lower value. A transformer achieves this voltage conversion using a primary coil and a secondary coil, each of which are wound on a ferromagnetic core and comprise a number of turns of an electrical conductor. A conventional distribution transformer employed in present day power distribution systems cannot protect digital loads against poor power quality, such as sags/swells/distortion. It is estimated that voltage disturbances cost millions of dollars every year to industries around the world.

Sometimes systems are connected to a power distribution line to improve power quality. Examples of such systems include dynamic voltage restorers (DVRs) and static VAR compensators (SVCs). DVRs sustain or restore an operational electric load during sags or spikes in voltage supply, while SVCs provide fast-acting reactive power compensation on power networks. DVRs and SVCs are often "add on" systems that are connected to, and used with, conventional distribution transformers.

More recently, it has been proposed to integrate power electronics with a conventional distribution transformer to improve power quality. The present invention is directed to a practical implementation of such a transformer.

SUMMARY OF THE INVENTION

In accordance with the present invention, a versatile distribution transformer is provided having a primary side for receiving input voltage and current from a source and a secondary side for providing output voltage and current to a load. The distribution transformer includes a ferromagnetic core and at least one winding structure. Each winding structure includes a primary winding for connection to the source and a secondary winding for connection to the load. A pocket is provided defining a cavity and having connectors electrically connected to the at least one winding structure. The connectors are disposed in the cavity. A power electronic module is removably mounted in the cavity of the pocket. The power electronic module is operable to reduce variations in the output voltage of the distribution transformer and includes a plurality of semiconductor switching devices and a plurality of connectors adapted to slidably engage the connectors of the pocket. The power electronic module is movable between a removed position, wherein the power electronic module is located outside the pocket, and an installed position, wherein the power electronic module is disposed in the cavity of the pocket and the connectors of the power electronic module engage the connectors of the pocket so as to electrically connect the power electronic module to the at least one winding structure.

Also provided in accordance with the present invention is a distribution transformer system having a primary side for receiving input voltage and current from a source and a secondary side for providing output voltage and current to a load. The distribution transformer system includes a ferromagnetic core and at least one winding structure. Each winding structure includes a primary winding for connection to the source and a secondary winding for connection to the load. A power electronic module is connected to the at least one winding structure and is operable to reduce variations in the output voltage of the distribution transformer. The power electronic module includes a plurality of semiconductor switching devices. A housing encloses the core, the at least one winding structure and the power electronic module. The housing includes one or more walls having sound insulating material secured to an inner surface thereof and a plurality of vents to permit air to flow through the housing

BRIEF DESCRIPTION OF THE DRAWINGS

The features, aspects, and advantages of the present invention will become better understood with regard to the following description, appended claims, and accompanying drawings where:

DETAILED DESCRIPTION OF ILLUSTRATIVE EMBODIMENTS

Figure 1:
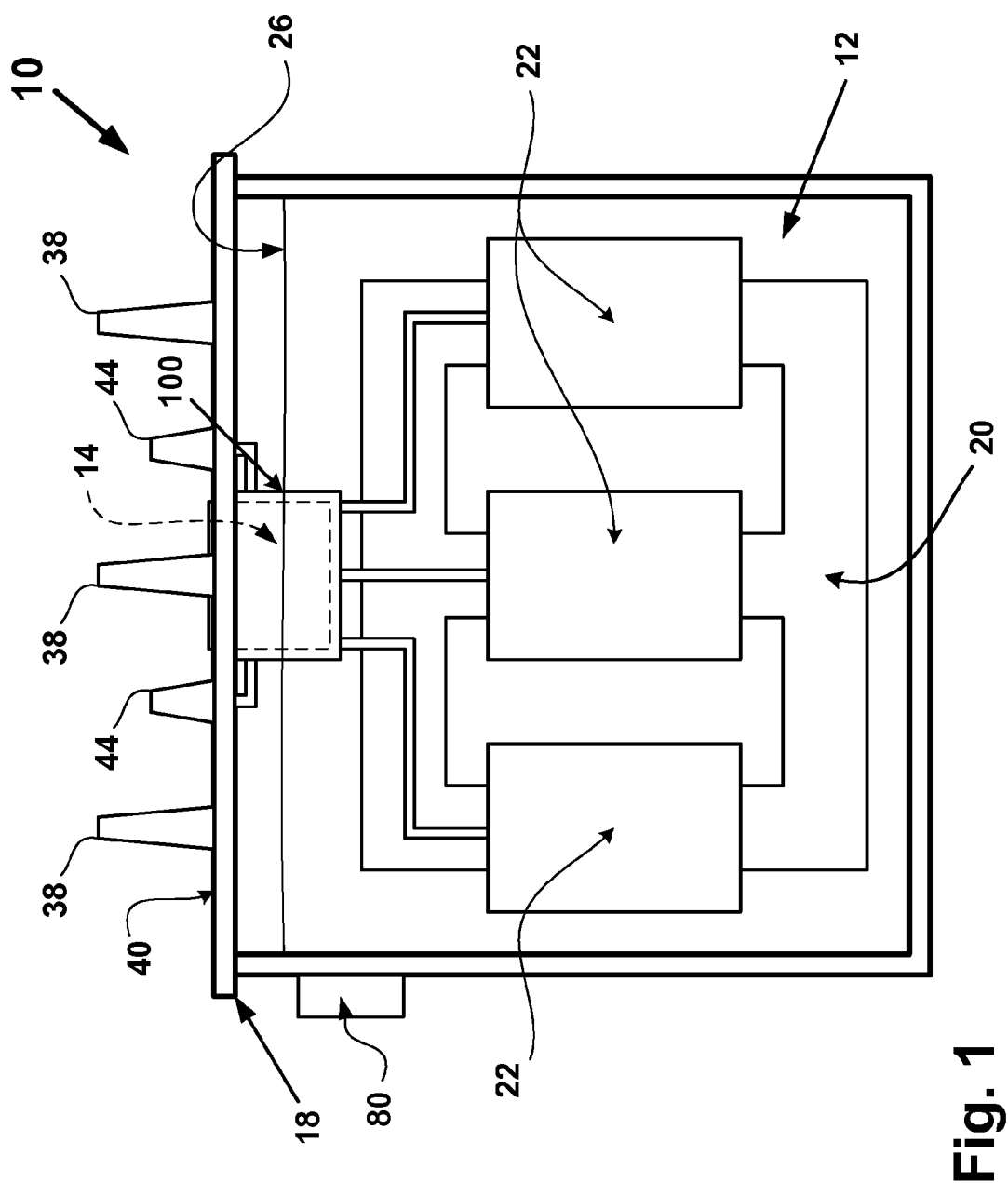
FIG. 1 shows a front view of a first versatile transformer with a front wall removed to show an interior of the first versatile transformer.

It should be noted that in the detailed description that follows, identical components have the same reference numerals, regardless of whether they are shown in different embodiments of the present invention. It should also be noted that in order to clearly and concisely disclose the present invention, the drawings may not necessarily be to scale and certain features of the invention may be shown in somewhat schematic form.

Figure 2:
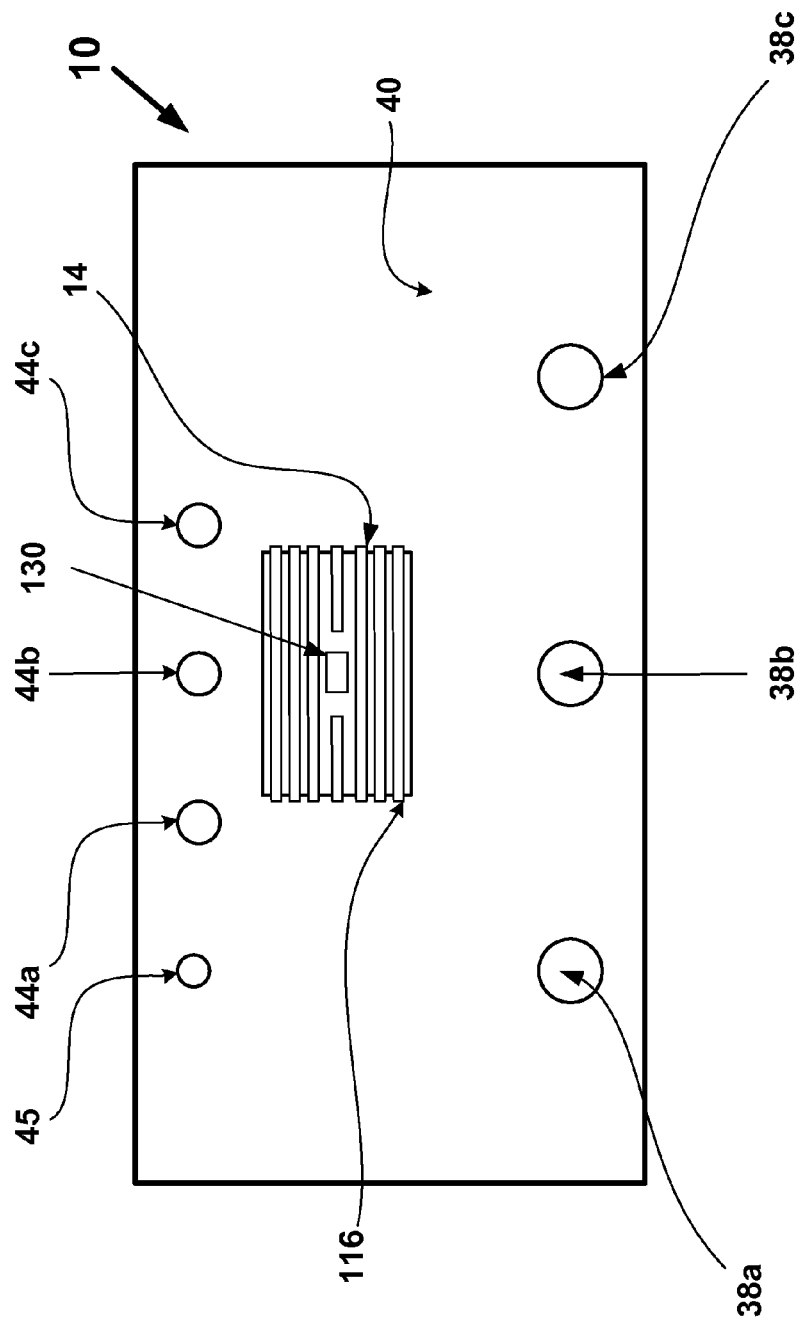
FIG. 2 shows a top plan view of the first versatile transformer.

Referring now to FIGS. 1 and 2, there is shown a versatile transformer 10 embodied in accordance with the present invention. The versatile transformer 10 is a three-phase, liquid-cooled distribution transformer having a kVA rating in a range of from about 112.5 kVA to about 15,000 kVA. A high voltage side of the versatile transformer 10 has a voltage in a range of from about 600 V to about 35 kV, while a low voltage side of the versatile transformer 10 has a voltage in a range of from about 120 V to about 15 kV. The versatile transformer 10 generally includes an electromagnetic transformer 12, a power electronic module (PEM) 14 and a tank or housing 18.

The electromagnetic transformer 12 includes a ferromagnetic core 20 and three winding structures 22, one for each phase. The core 20 is comprised of ferromagnetic metal (such as silicon grain-oriented steel) and may be generally rectangular in shape. The core 20 and the winding structures 22 are immersed in a dielectric fluid 26 inside the housing 18. Each winding structure 22 includes a primary winding structure and a secondary winding structure, each of which are wound on the ferromagnetic core 20. The primary winding structure comprises one or more primary windings and the secondary winding structure comprises one or more secondary windings. The primary winding structure and the secondary winding structure may be mounted concentrically to a leg of the core 20, with the secondary winding structure being disposed within and radially inward from the primary winding structure. The primary winding structures may be connected in a Y or Δ (delta) configuration and the secondary winding structures may be connected in a Y or Δ configuration. Thus, the electromagnetic transformer 12 may have a Y-Y, Y-Δ, Δ-Y, or Δ-Δ configuration.

Figure 3:
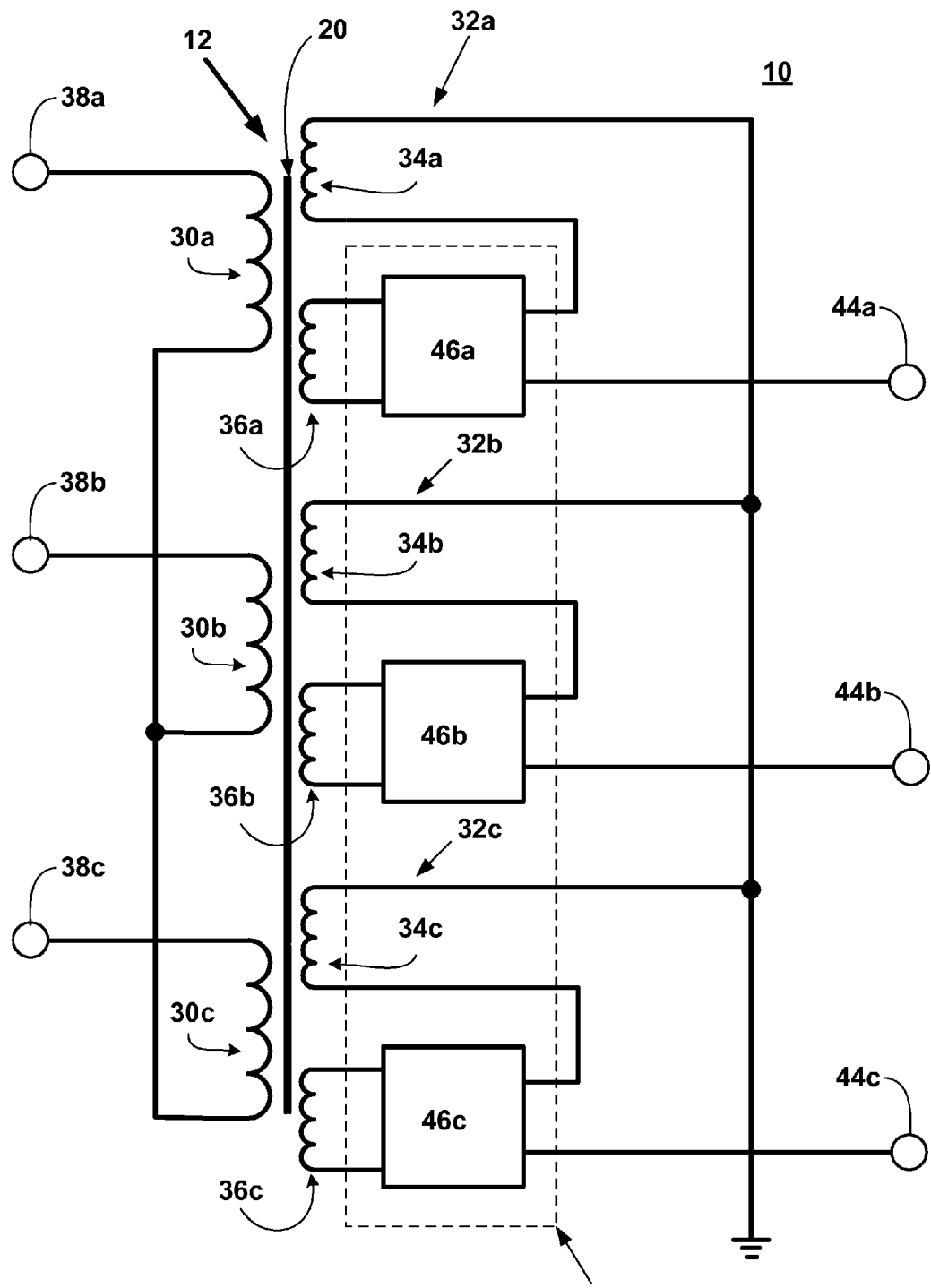
FIG. 3 shows a schematic circuit of the first versatile transformer with an AC-AC converter connected thereto.

In one embodiment shown in FIG. 3, each winding structure 22 includes a single primary winding 30 and a secondary winding structure 32 comprising two secondary windings 34, 36. In another embodiment, each winding structure 22 may have a single primary winding and a single secondary winding with a tap that helps form two secondary winding portions. The primary windings 30 for the three phases are connected to high voltage bushings 38 mounted to a top wall 40 of the housing 18. The PEM 14 is connected to low voltage bushings 44 mounted to the top wall 40. A neutral bushing 45 is mounted to the top wall 40 proximate to the low voltage bushings 44. The high voltage bushings 38 are arranged in a line, proximate to a front edge of the top wall 40. The neutral bushing 45 and the low voltage bushings 44 are arranged in a line, proximate to a rear edge of the top wall 40.

The PEM 14 is operable to control the power factor on the primary side of the versatile transformer 10 and to reduce variations in the output voltage in the event of a change in the input voltage. The PEM 14 may have one of a plurality of different configurations. For example, the PEM 14 may be an AC-AC converter or a voltage source converter (VSC) that is operable to convert between DC and AC voltages, i.e., to convert DC voltage to AC voltage and vice versa. In either of these general configurations, the PEM 14 may have a modular construction.

Figure 4:
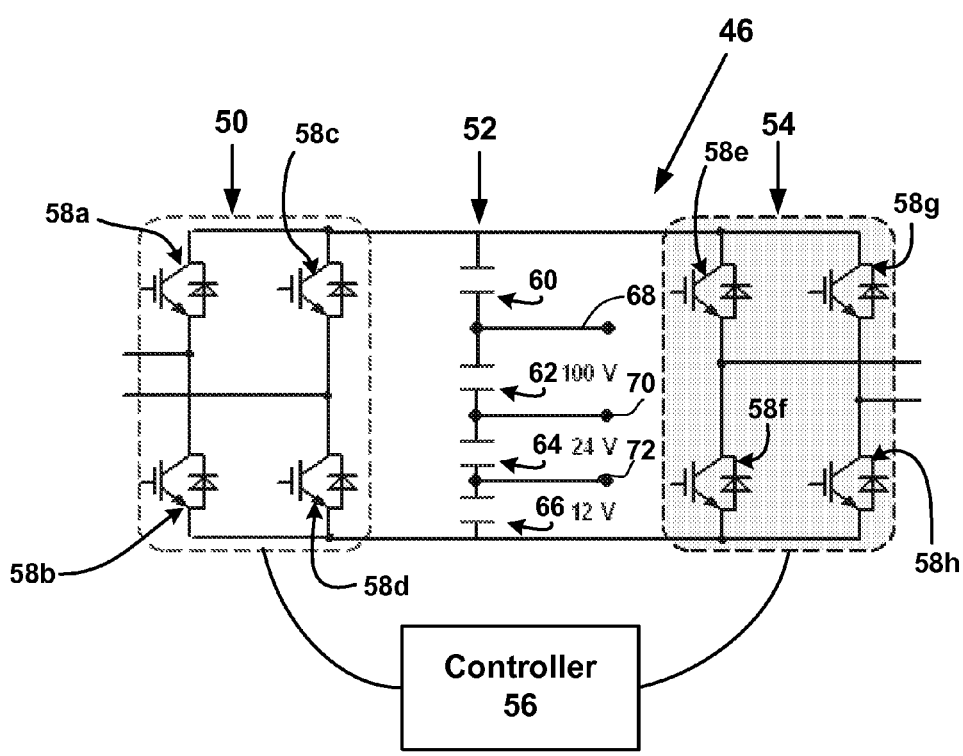
FIG. 4 shows a schematic circuit of the AC-AC converter.

An embodiment where the PEM 14 comprises an AC-AC converter is shown in FIGS. 3 and 4. In this embodiment (in which the PEM is designated as 14a), the AC-AC converter comprises AC-AC converters 46a, 46b, 46c for the three phases, respectively. In each secondary winding structure 32, the AC-AC converter 46 is connected to ends of the secondary winding 36 and is connected in series with the secondary winding 34. The voltage $V_{out}$ across the secondary winding structure 32 is equal to the voltage $V_{out1}$ across the secondary winding 34 plus the voltage $V_{out2}$ across the AC-AC converter 46. Under normal operating conditions, the secondary winding 34 produces 100% of the output voltage from the secondary winding structure 32 to the load. When required, the AC-AC converter 46 connected to the secondary winding 36 can produce up to 20% of the output voltage from the secondary winding structure 32 to the load.

Each AC-AC converter 46 may be an AC-DC-AC converter having the structure shown in FIG. 4. In this embodiment, the AC-AC converter 46 includes a first switching bridge 50 connected by a DC bus or bridge 52 to a second switching bridge 54. The first switching bridge 50 is connected to the ends of the secondary winding 36. Each of the first and second switching bridges 50, 54 is connected to and controlled by a controller 56. In addition, each of the first and second switching bridges 50, 54 comprises a plurality of switching devices 58. As shown in FIG. 4, each of the first and second switching bridges 50, 54 may comprise a pair of arms connected in parallel, with each arm having a pair switching devices 58 connected in series. Each switching device 58 may be an insulated gate bipolar transistor (IGBT) and an anti-parallel diode. The DC bridge 52 may comprise a plurality of capacitors connected in series. The capacitors may have the same or different capacitances. As shown in FIG. 4, the DC bridge 52 may have four capacitors 60, 62, 64, 66. A plurality of DC taps are connected to the DC bridge 52 and provide different maintained DC voltage levels. More specifically, three DC taps 68, 70, 72 may be connected between pairs of the capacitors 60, 62, 64, 66, respectively, and may have maintained voltages of 12 Volts, 24 Volts and 100 Volts. Combinations of these taps 68, 70, 72 can be used to obtain 36, 112, 123 and 136 Volts DC. Other voltage levels can be implemented as well.

It should be appreciated that other AC-AC converter topologies may be utilized for the AC-AC converters 46a, 46b, 46c. For example, neutral point AC-AC converters may be used having three, four, five, etc. levels. For those applications that do not require DC outputs, an AC-AC converter without a DC bridge can be used.

Figure 5:
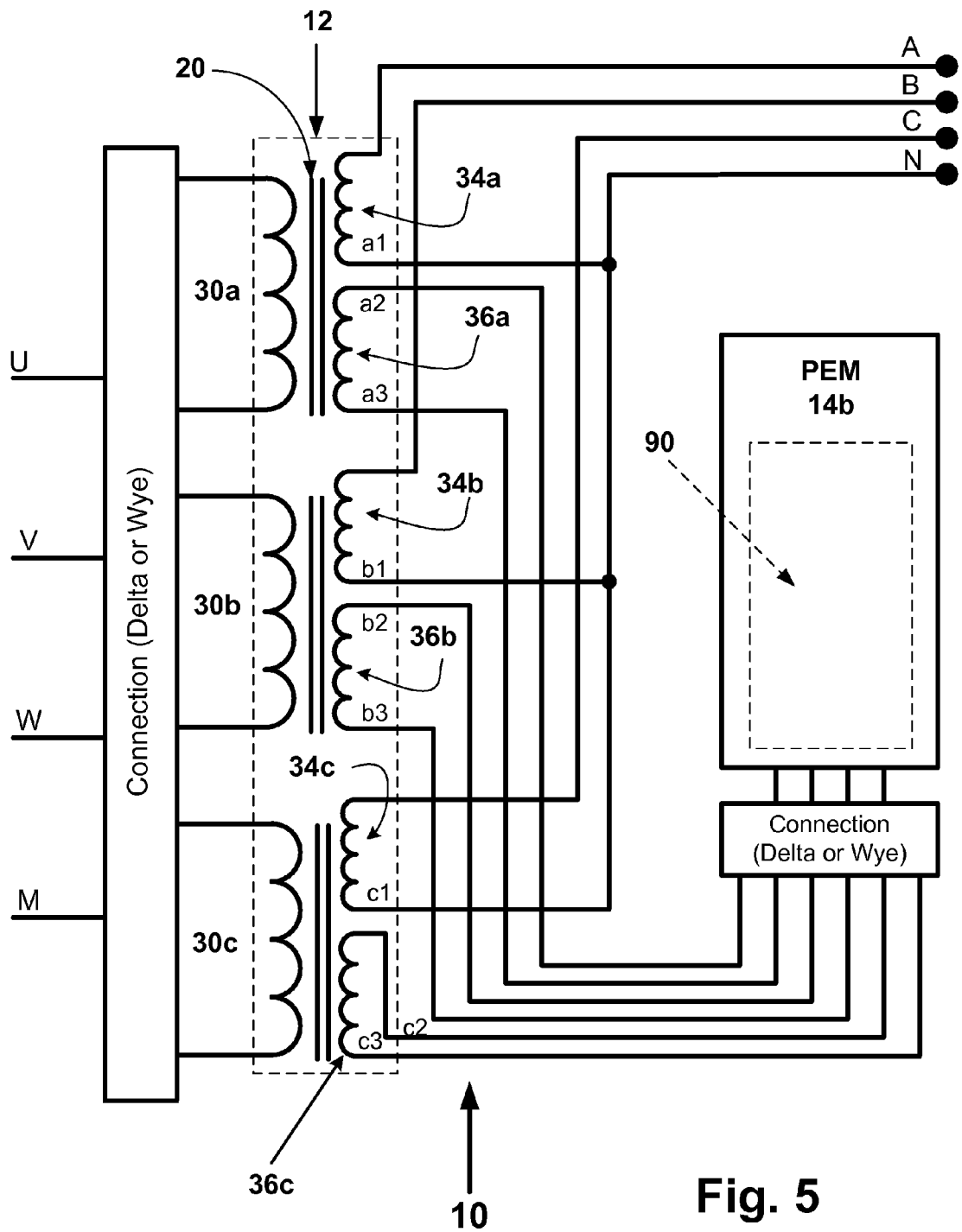
FIG. 5 shows a schematic circuit of the first versatile transformer with a voltage source converter connected thereto.
Figure 6:
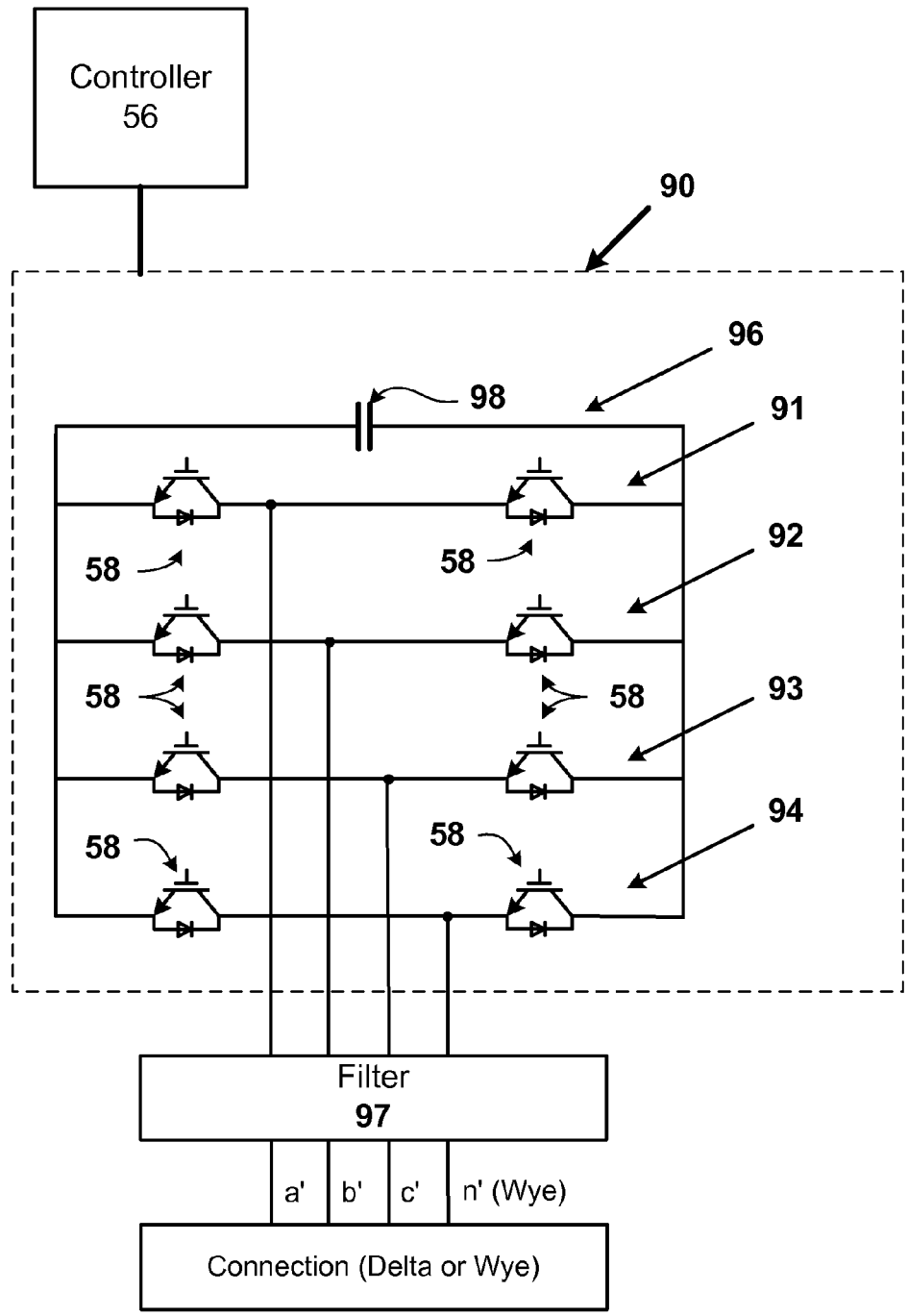
FIG. 6 shows a schematic circuit of the voltage source converter.

FIGS. 5 and 6 show another embodiment wherein the PEM (having the designation 14b) comprises a VSC 90, which may be connected in a Delta or Wye configuration, as indicated. The VSC 90 has three switching legs 91, 92, 93 if the secondary windings 36 are connected in a Delta configuration. If the secondary windings 36 are connected in a Wye configuration, a fourth leg 94 may be further included. Each of the switching legs 91-94 includes a pair of switching devices 58 connected in series, each of which may be IGBT and an anti-parallel diode. The controller 56 controls the operation of the switching devices 95. The switching legs 91-94 are connected in parallel with a DC bus 96 that includes a capacitor 98. DC voltage from the DC bus 96 is converted to sinusoidal AC voltages of different phases by the switching legs. A filter 97 is connected between the secondary windings 36 and the VSC 90. The filter 97 helps prevent high frequency harmonics from being introduced into the output voltages of the versatile transformer 10 and the currents in the primary and secondary windings 30, 34, 36 as a result of the switching of the switching devices 95. The filter 97 comprises inductors and optionally capacitors.

The controller 56 includes a processor for executing a program stored in associated memory. The controller 56 control the AC-AC converters 46a, b, c, respectively, or the VSC 90 (as the case may be) using pulse width modulation (PWM), wherein the switching devices 58 are opened and closed to create a series of voltage pulses, wherein the average voltage is the peak voltage times the duty cycle, i.e., the "on" and "off" times of pulses. In this manner, a sine wave can be approximated using a series of variable-width positive and negative voltage pulses. The phase and the amplitude of the sine wave can be changed by changing the PWM pattern.

The controller 56 may be an intelligent electronic device (IED) or may interface with an IED, wherein the IED controls and monitors operational aspects of the versatile transformer 10 other than the AC-AC converters 46. Such an IED 80 may be mounted to an outside wall of the housing 18 of the versatile transformer 10. The IED 80 may include a user interface, a processor, memory and a communication port. In addition to controlling the AC-AC converters 46 or the VSC 90 (as the case may be), the IED 80 monitors the operation of the versatile transformer 10 and communicates operating information to a remotely located control center over a communication link, which may be may be a physical hardwired link, a satellite link, a cellular link, a modem or telephone line link, an Internet link or any other wireless or wide area or shared local area network link. For example, the currents and voltages of the winding structures 22 may be measured by sensors that are connected for communication with the IED 80. In addition, the temperature of the dielectric fluid 26 and its moisture and gas content may be measured by sensors that are connected for communication with the IED 80. The IED 80 may periodically or continuously transmit values for these currents, voltages and other variable over the communication link to the control center and/or may transmit alarms to the control center over the communication link if the values exceed certain predetermined limits. In addition to transmitting information about the windings, the IED 80 may transmit information about the operation of the AC-AC converters 46 to the control center over the communication link. Moreover, the IED 80 may receive and implement control commands from the control center for changing the operation of the AC-AC converters 46.

Although in the description above, the PEM 14 is shown and described as being connected to the secondary winding structure of the electromagnetic transformer 12, it should be appreciated that the PEM 14 can be connected to the primary winding structure. Examples of how the PEM 14 may be connected to the primary winding structure are shown in U.S. patent application Ser. No. 12/701,235, entitled "Hybrid Distribution Transformer with AC & DC Power Capabilities", filed on Feb. 5, 2010, and in U.S. patent application Ser. No. 12/713,766, entitled "A Hybrid Distribution Transformer with an Integrated Voltage Source Converter", filed on Feb. 26, 2010, both of which are incorporated herein by reference. These two applications also provide further examples of how the PEM 14 may be constructed and connected to the secondary winding structure.

Figure 7:
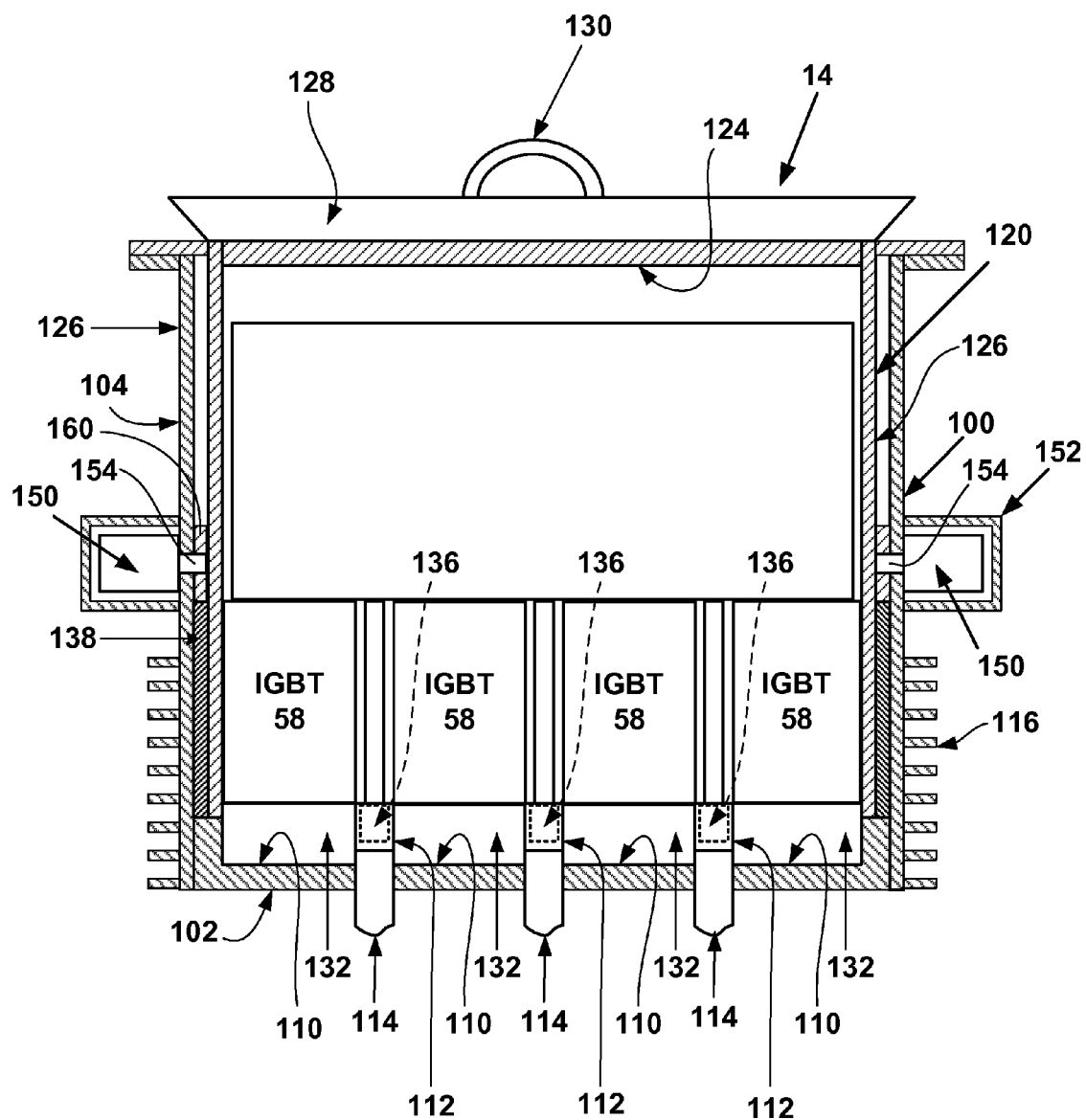
FIG. 7 shows a sectional front view of a power electronic module containing the AC-AC converter mounted inside a pocket.

With reference now to FIGS. 1, 2 and 7, the PEM 14 is removably mounted in a cavity of a pocket 100 of the housing 18. The pocket 100 is secured to the top wall 40 of the housing 18, around an opening in the top wall 40. The opening and the pocket 100 are located between the low voltage bushings 44 and the high voltage bushings 38, but more toward the low voltage bushings 44. The opening and the pocket 100 are located about midway between the end edges of the top wall 40. The pocket 100 may be generally rectangular in shape and is constructed of metal. The portion of the pocket 100 extending into the housing 18 is sealed to prevent the ingress of any of the dielectric fluid 26 into the interior of the pocket 100. A portion of the pocket 100 may be immersed in the dielectric fluid 26. For example, as shown in FIG. 1, an end wall 102 and lower portions of side walls 104 and front and rear walls of the pocket 100 may be immersed in the dielectric fluid 26. Alternately, the pocket 100 may be mounted above a top level of the dielectric fluid 26 so as to not be in contact therewith. A plurality of depressions 110 may be formed in the end wall 102 on an interior side thereof. Between the depressions 110, respectively, a plurality of connectors 112 may be mounted to the end wall 102 and extend upwardly therefrom. The connectors 112 are electrically connected to the electromagnetic transformer 12 and to the low voltage bushings 44 by bus bars 114. A series of spaced-apart cooling fins 116 may be secured to, and extend outwardly from a lower portion of the pocket 100. The cooling fins 116 are also immersed in the dielectric fluid 26 and help convey and disperse heat from the PEM 14 into the dielectric fluid 26.

In addition to the circuitry described above, the PEM 14 includes a housing 120 composed of metal and having a bottom wall, a top wall 124 and side walls 126. The housing 120 encloses the switching devices 58 and other circuitry described above. A series of spaced-apart cooling fins 128 may be secured to the top wall 124 and extend upwardly therefrom. In the center of the top wall 124, a handle 130 is mounted to the top wall 124. The handle 130 may be fixed in an upright (vertical) position or may be pivotable between a horizontal, stowed position, and a vertical, use position. A plurality of heat sinks 132 may extend through the bottom wall 122 and project from an outer surface thereof. Between the heat sinks 132, respectively, a plurality of connectors 136 may extend through the bottom wall 122 and also project from an outer surface thereof. The switching devices 58 are mounted inside the housing 120 so as to be in contact with the heat sinks 132 in order to conduct heat to the heat sinks 132 when the switching devices 58 are in operation. A number of the switching devices 58 may also be in contact with bottom portions of the side walls 126 so as to conduct heat thereto. Metal plates 138 may be secured to outside surfaces of the bottom portions of the side walls 126 to conduct heat to the pocket 100 and thence the dielectric fluid 26.

The PEM 14 is vertically movable into and out of the pocket 100. More specifically, the PEM 14 is movable between an installed position and a removed position where the PEM 14 is totally removed from the pocket 100. In the installed position, all of the PEM 14 is disposed in the pocket 100, except the top wall 124, the cooling fins 128 and the handle 130. In addition, the connectors 136 of the PEM 14 are received inside the connectors 112 of the pocket 100 and make electrical connections therewith, thereby electrically connecting the PEM 14 to the electromagnetic transformer 12 and the low voltage bushings 44 in the manner shown in FIG. 3 and described above. Further in addition, the heat sinks 132 are received in the depressions 110, respectively, thereby permitting heat to be conducted from the heat sinks 132 of the PEM 14 to the end wall 102 of the pocket 100. Movement of the PEM 14 between the installed position and the removed position may be effectuated manually or mechanically using a lifting device, such as a crane, depending on the weight of the PEM 14. The handle 130 may be used to facilitate the movement of the PEM 14, whether the movement is performed manually or mechanically.

It should be appreciated that the receipt of the connectors 136 of the PEM 14 inside the connectors 112 of the pocket 100 provides a slide-fit electrical connection between the PEM 14 and pocket 100 that permits the PEM 14 to be facilely connected and disconnected from the electromagnetic transformer 12.

Communication between the IED 80 and the PEM 14 may be provided over a communication link that is broken when the PEM 14 is moved to the removed position. For example, the communication link may comprise a USB connector mounted inside the cavity of the pocket 100 and a mating USB connector mounted on the PEM 14. When the PEM 14 is in the installed position, the two USB connectors mate with each other to establish communication between the IED 80 and the PEM 14 across the communication link. Alternately, the communication link may be a wireless link, such as a Bluetooth link, that can be maintained even when the PEM 14 is moved out of the installed position. As set forth above, the controller 56 may be mounted in the PEM 14 and interface with the IED 80, or the controller 56 may be a part of the IED 80.

In order to prevent the PEM 14 from being moved into or out of the installed position during operation of the versatile transformer 10, an interlock system may be provided. The interlock system may comprise a plurality of electromagnetic actuators 150 disposed in housings 152 secured to the side walls 104 of the pocket 100. Each actuator 150 includes a solenoid coil and an armature. In each actuator 150, a retaining pin 154 is secured to the armature and is movable therewith. The retaining pin 154 is movable through an opening in the side wall 104 of the pocket 100 between an extended position and a retracted position. A spring biases the armature and thus the retaining pin 154 to the retracted position. Each solenoid coil receives power from a current transformer (not shown) connected to a lead of one of the primary windings 30. When power is provided to the primary windings 30, the current transformer energizes the solenoid coil, thereby causing the armature to move the retaining pin 154 to the extended position. When power is not provided to the primary windings 30, the solenoid is de-energized and the retaining pin 154 is biased to the retracted position.

When the PEM 14 is in the installed position, the retaining pins 152 are aligned with bores in blocking plates 160, which are secured to the exterior of the side walls 126. When the solenoids of the actuators 150 are energized and the PEM 14 is in the installed position, the retaining pins 152 extend into the bores of the blocking plates 160, thereby preventing the PEM 14 from being moved out of the installed position. When the solenoids of the actuators 150 are energized and the PEM 14 is in the removed position, the retaining pins 152 extend into the interior of the pocket 100 and prevent the PEM 14 from being moved into the installed position. Since the solenoids of the actuators 150 are only energized when the primary windings 30 are provided with power, the retaining pins 152 prevent the PEM 14 from being moved into or out of the installed position when power is provided to the primary windings 30, i.e., during operation of the versatile transformer 10.

Figure 8:
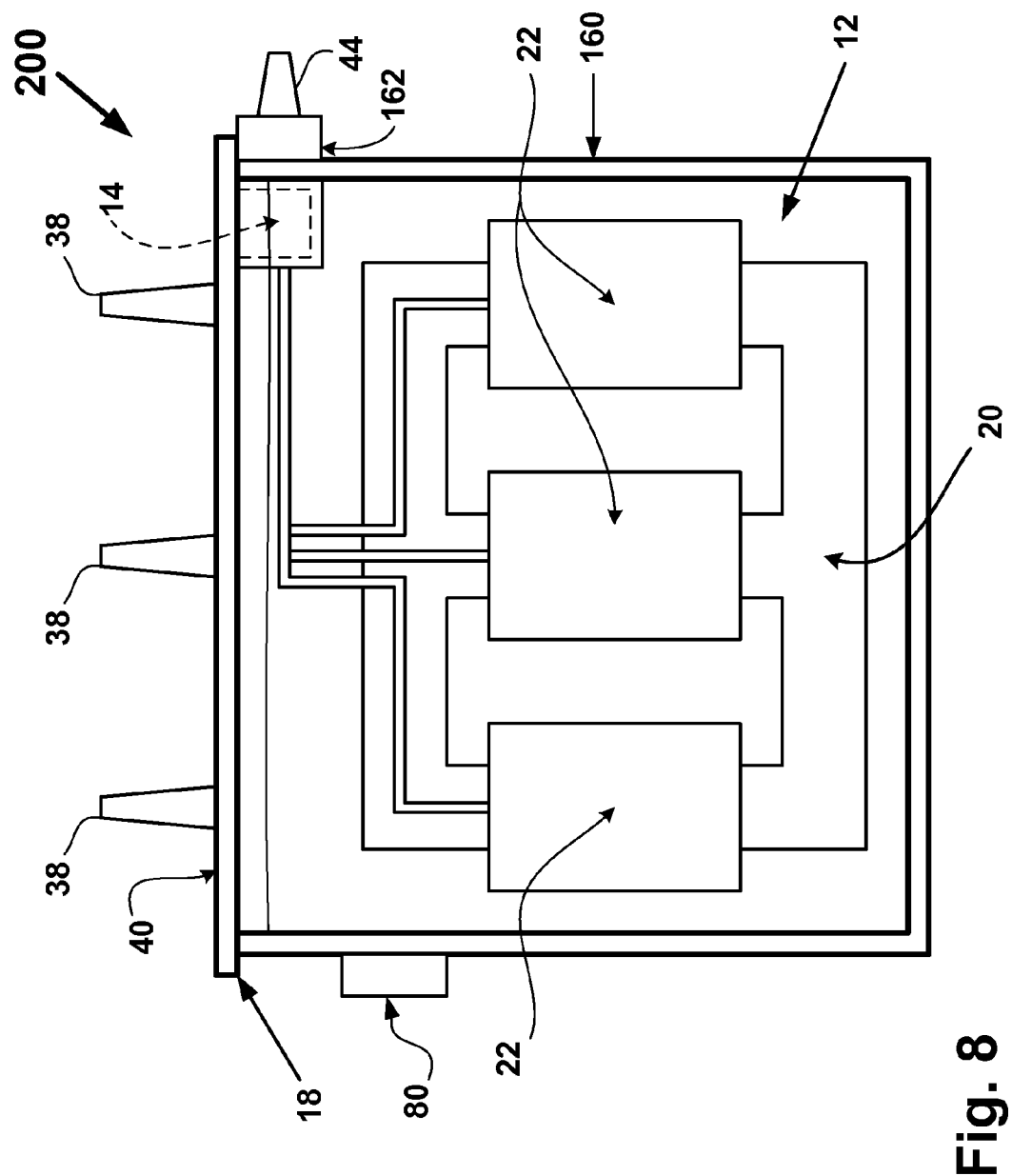
FIG. 8 shows a front view of a second versatile transformer with a front wall removed to show an interior of the second versatile transformer.
Figure 9:
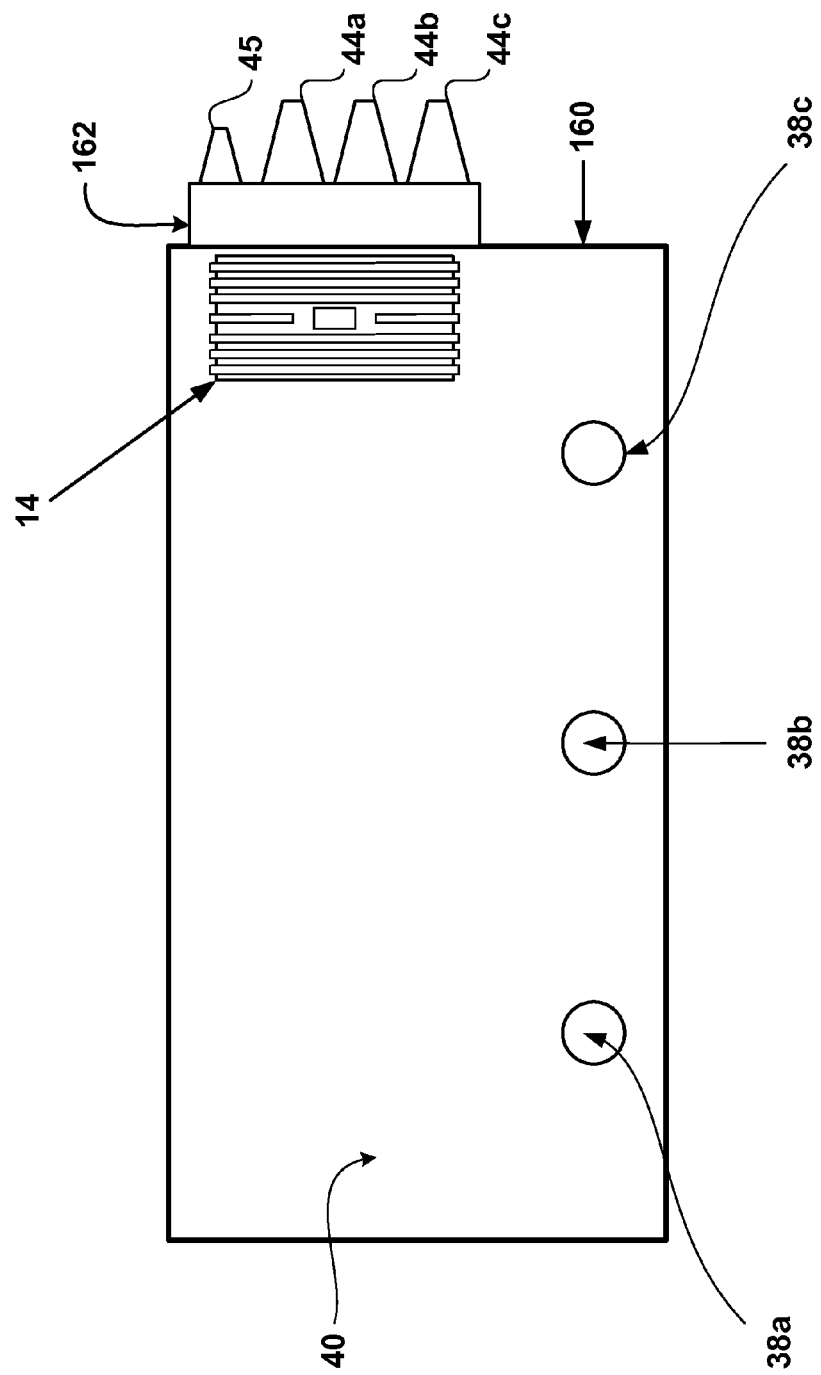
FIG. 9 shows a top plan view of the second versatile transformer.

Referring now to FIGS. 8 and 9, there is shown a second versatile distribution transformer 200 constructed in accordance with a second embodiment of the present invention. The second versatile transformer 200 has substantially the same construction as the versatile transformer 10, except for the differences described below. The low voltage bushings 44 are mounted to a side wall 160 (instead of being mounted to the top wall 40 of the housing 18) and the pocket 100 and the PEM 14 may be located proximate to the side wall 160 (instead of in the center, toward a rear edge of the top wall 40). The low voltage bushings 44 may be mounted to the side wall 160 by a bulkhead 162, which is secured over an opening in the side wall 160.

Figure 10:
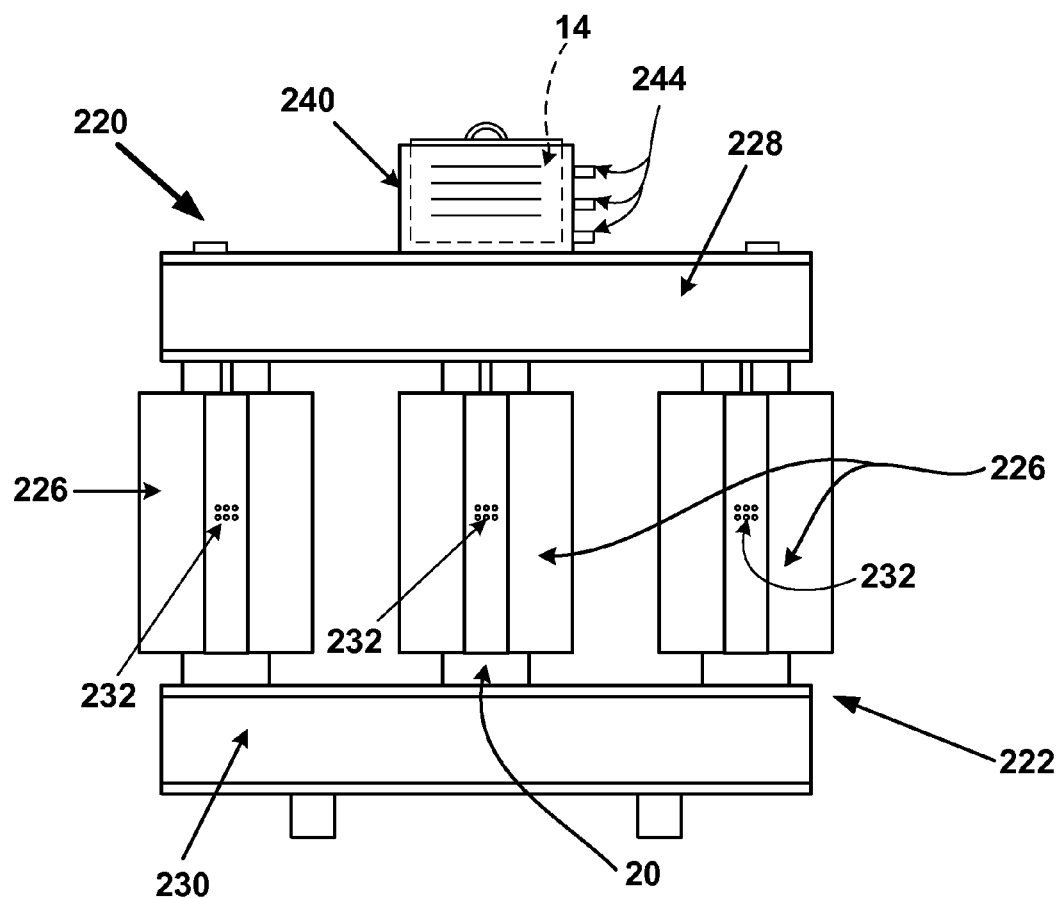
FIG. 10 shows a front view of a third versatile transformer.
Figure 11:
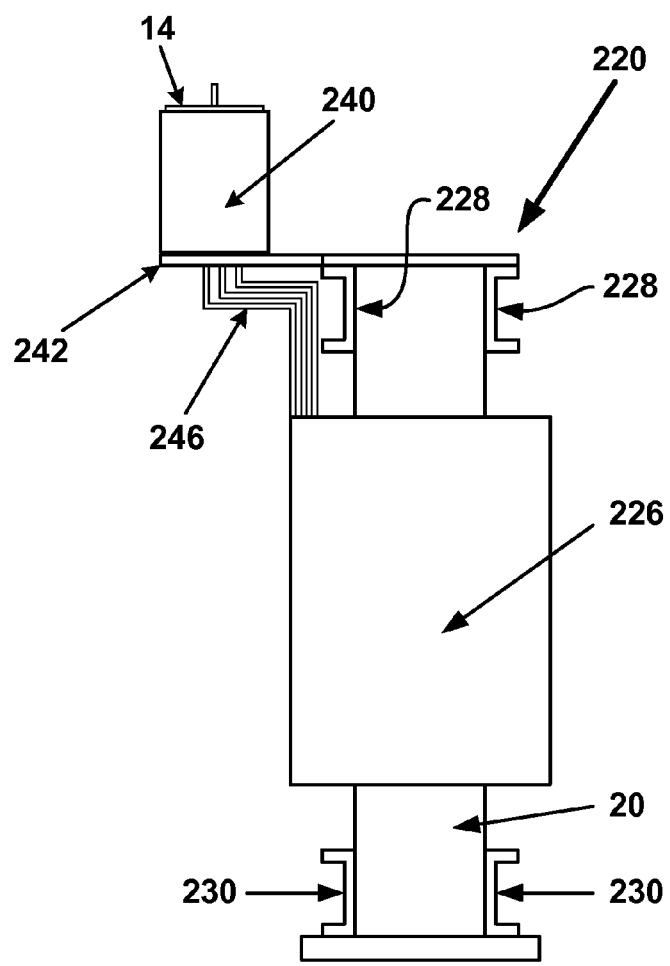
FIG. 11 shows a side view of the third versatile transformer.

Referring now to FIGS. 10 and 11, there is shown a third versatile distribution transformer 220 constructed in accordance with a third embodiment of the present invention. The third versatile transformer 220 is a dry transformer and generally includes an electromagnetic transformer 222 and a power electronic module (PEM) 14.

The electromagnetic transformer 222 includes a ferromagnetic core 20 and three winding structures 226, one for each phase.

The core 20 includes three evenly spaced-apart legs extending between a top yoke and a bottom yoke. Each leg may be formed from a plurality of plates having different widths that are arranged to provide the leg with a cruciform cross-section. The top yoke is clamped between a pair of top clamp plates 228, while the bottom yoke is clamped between a pair of bottom clamp plates 230. The top and bottom clamp plates 228, 230 hold the core 20 and help maintain its structural integrity.

The winding structures 226 have substantially the same construction as the winding structures 22, except for the differences described below. The winding structures 226 are generally cylindrical in shape and are covered with a varnish (such as a polyester varnish) or a resin (such as an epoxy resin). More specifically, the winding structures 226 may be vacuum impregnated with a varnish or simply dipped in the varnish. Alternately, the winding structures 226 may be encapsulated in a resin, with or without using a mold and with or without applying a vacuum. Each primary winding 30 has a plurality of taps 232, which are located toward the center of the primary winding 30 and extend from a front side thereof.

A plate 242 is secured to one or more of the top clamp plates 228, midway between the sides of the third versatile distribution transformer 220. A pocket 240 is mounted to the plate 242. As shown in FIG. 9, the plate 242 may extend rearward from the rear most one of the top clamp plates 228 so that the pocket 240 and the PEM 14 are disposed rearward from a middle one of the winding structures 226. Alternately, the plate 242 may be disposed between the top clamp plates 228 so that the pocket 240 and the PEM 14 are disposed directly over the middle one of the winding structures 226. The pocket 240 has substantially the same construction as the pocket 100, except for the differences described below. The pocket 240 may have ventilation openings to permit cooling air to pass through the pocket 240. In addition, secondary connectors 244 are secured to, and extend away from, one of the side walls 104 of the pocket 240. The secondary connectors 244 are for connection to a load. The connectors 112 of the pocket 240 are electrically connected to the electromagnetic transformer 222 and to the secondary connectors 244 by bus bars 246.

The PEM 14 is vertically movable into and out of the pocket 240 using the handle 130. The interlock system with the electromagnetic actuators 150 prevents the PEM 14 from being moved into or out of the installed position during the operation of the third versatile distribution transformer 220. The slide-fit electrical connection between the PEM 14 and the pocket 240 permits the PEM 14 to be facilely connected and disconnected from the electromagnetic transformer 222.

Figure 12:
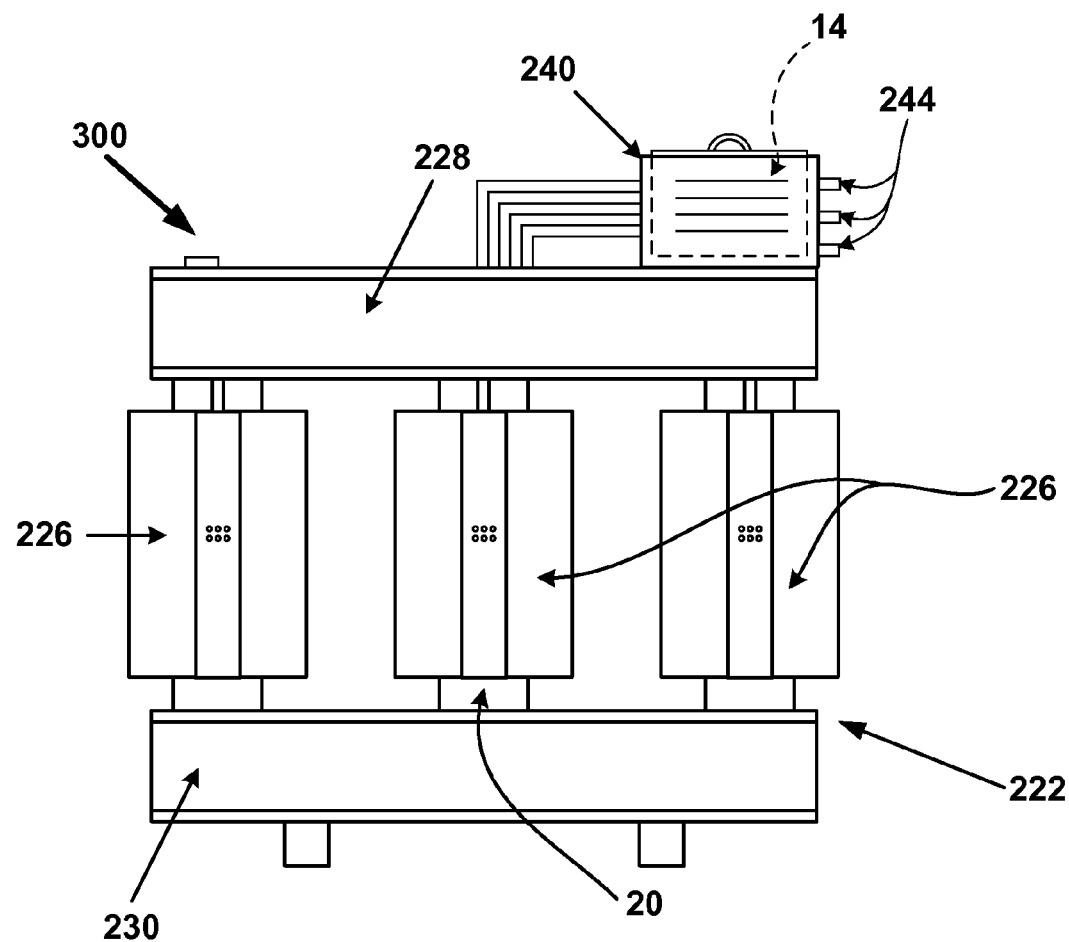
FIG. 12 shows a front view of a fourth versatile transformer.

Referring now to FIG. 12, there is shown a fourth versatile distribution transformer 300 constructed in accordance with a fourth embodiment of the present invention. The fourth versatile distribution transformer 300 has substantially the same construction as the third versatile distribution transformer 220, except for the differences described below. The plate 242 is secured to one or more of the top clamp plates 228, toward one side of the fourth versatile distribution transformer 300. The plate 242 may extend rearward from the rear most one of the top clamp plates 228 so that the pocket 240 and the PEM 14 are disposed rearward from an end one of the winding structures 226. Alternately, the plate 242 may be disposed between the top clamp plates 228 so that the pocket 240 and the PEM 14 are disposed directly over the end one of the winding structures 226.

Figure 13:
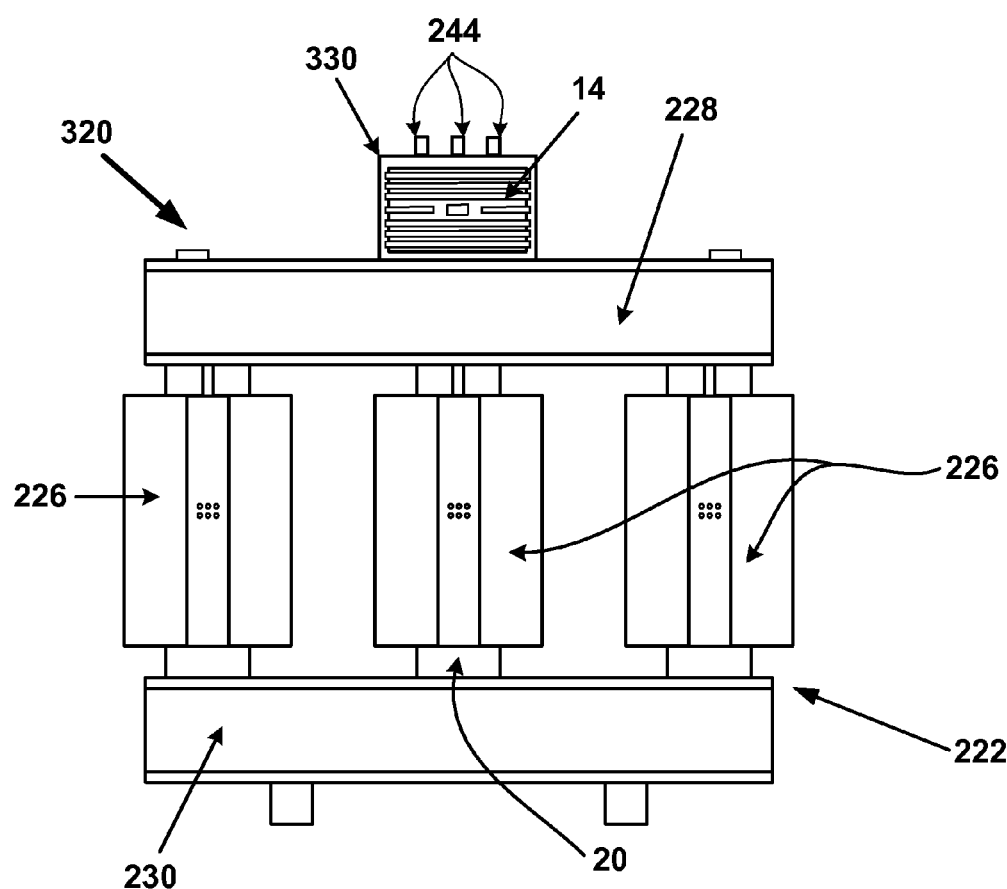
FIG. 13 shows a front view of a fifth versatile transformer.
Figure 14:
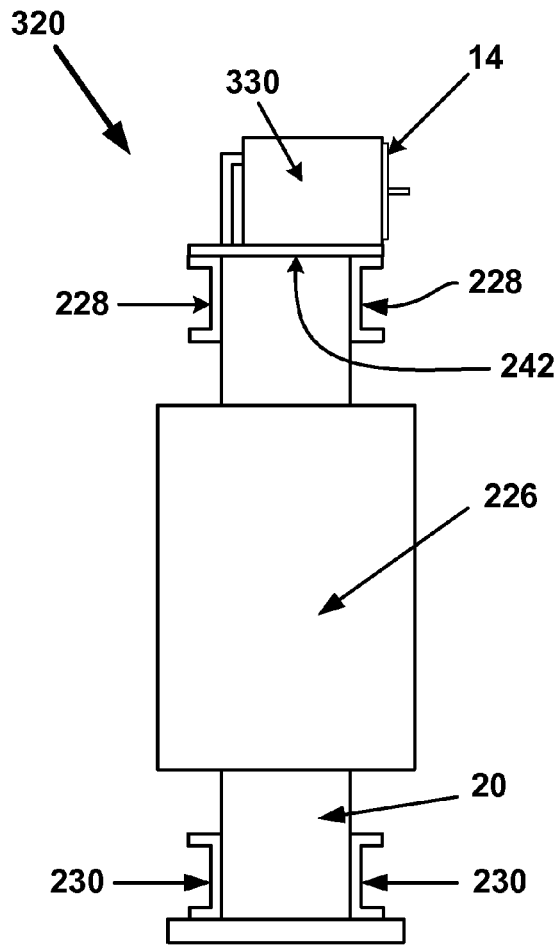
FIG. 14 shows a side view of the fifth versatile transformer.

Referring now to FIGS. 13 and 14, there is shown a fifth versatile distribution transformer 320 constructed in accordance with a fifth embodiment of the present invention. The fifth versatile distribution transformer 320 has substantially the same construction as the third versatile distribution transformer 220, except for the differences described below. The fifth versatile distribution transformer 320 has a pocket 330 having substantially the same construction as the pocket 240, except for the differences described below. The pocket 330 is oriented such that the opening in the pocket 330 is directed forward. The secondary connectors 244 are secured to, and extend vertically from a top wall, as shown in FIG. 13. Alternately, the secondary connectors 244 may be secured to a side wall 104 and extend horizontally therefrom.

The plate 242 is secured to one or more of the top clamp plates 228, midway between the sides of the fifth versatile distribution transformer 320. The plate 242 may extend rearward from the rear most one of the top clamp plates 228 so that the pocket 330 and the PEM 14 are disposed rearward from a middle one of the winding structures 226. Alternately, the plate 242 may be disposed between the top clamp plates 228 so that the pocket 330 and the PEM 14 are disposed directly over the middle one of the winding structures 226, as is shown in FIG. 14. The PEM 14 is horizontally movable into and out of the pocket 330 using the handle 130.

Figure 15:
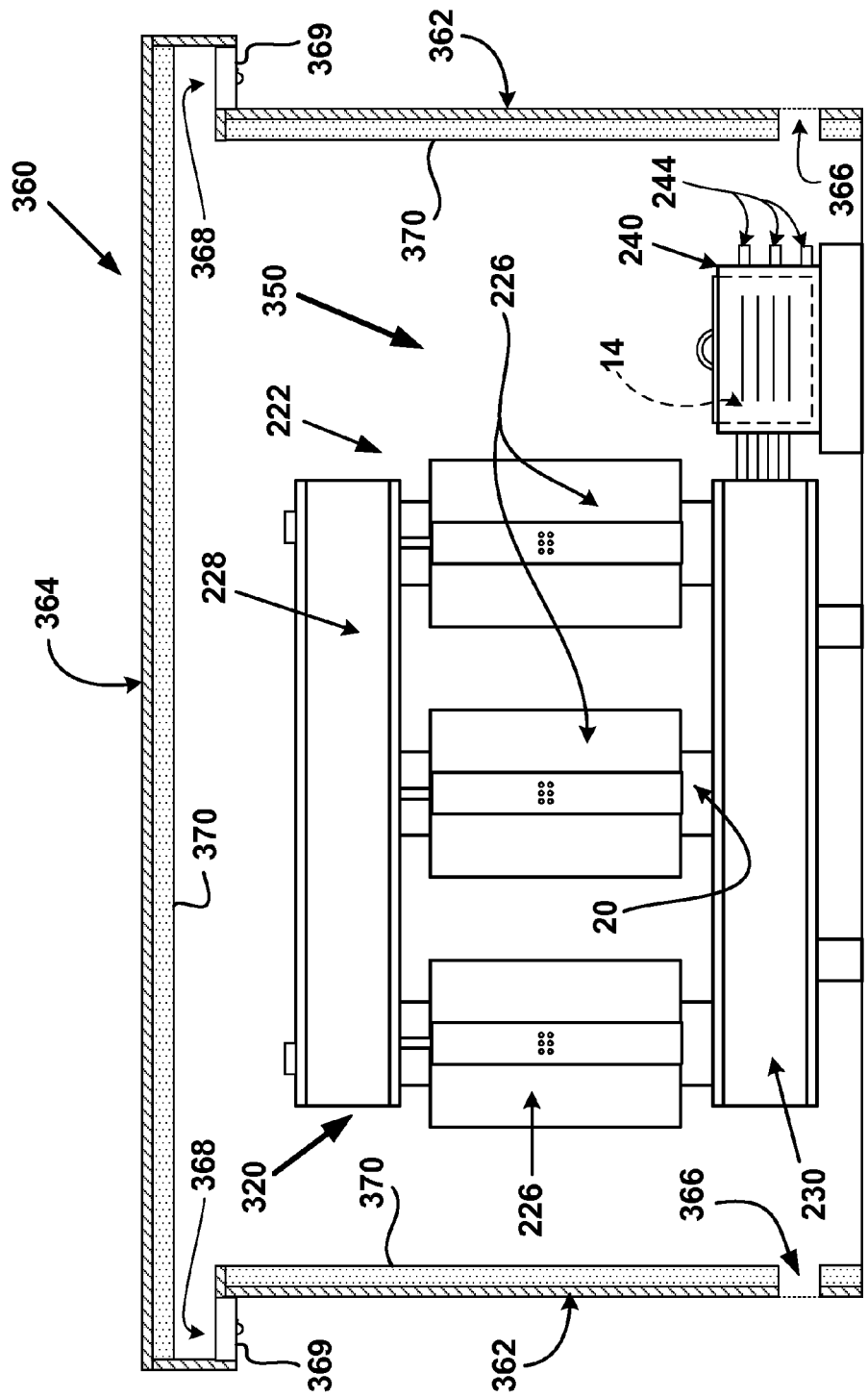
FIG. 15 shows a front view of a sixth versatile transformer enclosed in a housing, with a portion of the housing removed to show the interior thereof.

Referring now to FIG. 15, there is shown a sixth versatile distribution transformer 350 constructed in accordance with a sixth embodiment of the present invention. The sixth versatile distribution transformer 350 has substantially the same construction as the third versatile distribution transformer 220, except for the differences described below. The pocket 240 is not mounted to the plate 242 on top of the top clamp plates 228. Instead, the pocket 240 is mounted on a pad, next to the electromagnetic transformer 222.

A housing 360 is disposed around the electromagnetic transformer 222 and the pocket 240 with the PEM 14 disposed therein. The housing 360 includes side walls 362 and a roof 364, which may be constructed from sheet metal. A lower inlet vent 366 is located in each of the side walls 362 and may be covered with a screen. Upper outlet vents 368 may be formed in overhang portions of the roof 364 (as shown) in order to permit air to exit the housing 360 in a downward manner. Alternately, the upper outlet vents may be formed in upper portions of the side walls 362, respectively. When the sixth versatile distribution transformer 350 is operating, cool exterior air is drawn in the lower inlet vents 366 and is carried by convection up through and across the electromagnetic transformer 222, the pocket 240 and the PEM 14 and out the upper outlet vents 368. Electric fans 369 may be mounted in or proximate to the outlet vents 368 to increase the flow of air up to and out of the upper outlet vents 368. The fans 369 may be provided with DC power from the DC bridge 52 or DC bus 96 (as the case may be) of the PEM 14.

In order to attenuate the sound generated by the sixth versatile distribution transformer 35, sound insulating material 370 is secured to the interior surfaces of the side walls 362 and the roof 364. The sound insulating material 370 may be comprised of glass fibers, or a contoured polymeric foam, such as an open cell polyurethane acoustical foam.

Although not shown, the third, fourth and fifth versatile distribution transformers 220, 300, 320 may also be enclosed in the housing 360.

It should be appreciated that the versatile distribution transformers described above may utilize PEMs and pockets having different constructions than those described above. For example, the dry transformers 220, 300, 320 may utilize a PEM having a construction substantially the same as the PEM 14, except for the orientation of the switching devices 58. The switching devices 58 may be mounted against the vertically-extending walls (and top wall if the PEM is horizontally movable) to better dissipate heat.

It should further be appreciated that the versatile distribution transformers described above, particularly those enclosed in a housing (such as housing 360), may be modified so as to not utilize pockets. In these modified versatile distribution transformers, the PEMs may not be enclosed or may be disposed in other enclosures and may have fixed connections to the electromagnetic transformers.

It should be still further appreciated that although the present invention has been described in the context of a three-phase transformer, the present invention may be utilized in a single phase transformer as well.

It is to be understood that the description of the foregoing exemplary embodiment(s) is (are) intended to be only illustrative, rather than exhaustive, of the present invention. Those of ordinary skill will be able to make certain additions, deletions, and/or modifications to the embodiment(s) of the disclosed subject matter without departing from the spirit of the invention or its scope, as defined by the appended claims.

What is claimed is:

1. A distribution transformer having a primary side for receiving input voltage and current from a source and a secondary side for providing output voltage and current to a load, the distribution transformer comprising:
  a ferromagnetic core;
  at least one winding structure, each winding structure comprising a primary winding for connection to the source and a secondary winding for connection to the load;
  a pocket defining a cavity and having connectors electrically connected to the at least one winding structure, the connectors being disposed in the cavity;
    a power electronic module operable to reduce variations in the output voltage of the distribution transformer, the power electronic module being removably mounted in the cavity of the pocket, the power electronic module comprising a plurality of semiconductor switching devices and a plurality of connectors adapted to slidably engage the connectors of the pocket, the power electronic module being movable between a removed position, wherein the power electronic module is located outside the pocket, and an installed position, wherein the power electronic module is disposed in the cavity of the pocket and the connectors of the power electronic module engage the connectors of the pocket so as to electrically connect the power electronic module to the at least one winding structure.

2. The distribution transformer of claim 1, wherein the power electronic module is further operable to control the power factor on the primary side of the distribution transformer.

3. The distribution transformer of claim 1, wherein the pocket is mounted above the core and the at least one winding structure.

4. The distribution transformer of claim 1, wherein the distribution transformer further comprises:
  a tank defining an interior space containing the core and the at least one winding structure;
  a dielectric fluid disposed in the interior space of the tank such that the core and the at least one winding structure are immersed in the dielectric fluid.

5. The distribution transformer of claim 4, wherein the pocket extends into the interior space of the tank.

6. The distribution transformer of claim 5, wherein at least a portion of the pocket is immersed in the dielectric fluid.

7. The distribution transformer of claim 6, wherein the pocket is secured to a top wall of the tank and the power electronic module is vertically movable into and out of the cavity of the pocket.

8. The distribution transformer of claim 1, wherein the distribution transformer is a dry transformer and further comprises a structure for holding the core.

9. The distribution transformer of claim 8, wherein the pocket is supported on the structure, above the core and the at least one winding structure.

10. The distribution transformer of claim 9, wherein the power electronic module is vertically movable into and out of the cavity of the pocket.

11. The distribution transformer of claim 1, further comprising an interlock system that prevents the power electronic module from being moved to or from the installed position when power is provided to the at least one winding structure.

12. The distribution transformer of claim 10, wherein the interlock system comprises at least one electromagnetic actuator operable to move a retaining pin between an extended position and a retracted position, wherein when the retaining pin is in the extended position, the retaining pin prevents the movement of the power electronic module from the removed position to the installed position and from the installed position to the removed position.

13. The distribution transformer of claim 1, wherein the at least one winding structure comprises three winding structures for three phases of power, respectively.

14. The distribution transformer of claim 13, wherein each of the winding structures further comprises an auxiliary secondary winding.

15. The distribution transformer of claim 14, wherein the power electronic module comprises three AC-AC converters for the three winding structures, respectively, each AC-AC converter comprising:
   a first switching bridge connected to the auxiliary secondary winding of the winding structure that corresponds to the AC-AC converter, the first switching bridge comprising a plurality of the semiconductor switching devices;
   a second switching bridge connected in series with the secondary winding of the winding structure that corresponds to the AC-AC converter, the second switching bridge comprising a plurality of the semiconductor switching devices;
   a DC bus connected between the first and second switching bridges; and
   a controller operable to control the first and second switching bridges.

16. The distribution transformer of claim 15, wherein the semiconductor switching devices comprise insulated gate bipolar transistors.

17. The distribution transformer of claim 14, wherein the power electronic module comprises a voltage source converter comprising three switching circuits and a DC bus connected in parallel, the switching circuits being connected to the auxiliary secondary windings, respectively, and comprising the semiconductor switching devices.

18. A distribution transformer system having a primary side for receiving input voltage and current from a source and a secondary side for providing output voltage and current to a load, the distribution transformer system comprising:
   a ferromagnetic core;
   at least one winding structure, each winding structure comprising a primary winding for connection to the source and a secondary winding for connection to the load;
   a power electronic module connected to the at least one winding structure and operable to reduce variations in the output voltage of the distribution transformer, the power electronic module comprising a plurality of semiconductor switching devices; and
   a housing enclosing the core, the at least one winding structure and the power electronic module, the housing comprising one or more walls having sound insulating material secured to an inner surface thereof and a plurality of vents to permit air to flow through the housing.

19. The distribution transformer system of claim 18, wherein the power electronic module comprises a plurality of switching circuits and a DC bus connected in parallel, the switching circuits being connected to the at least one winding structure and comprising the semiconductor switching devices.

20. The distribution transformer system of claim 19, further comprising at least one fan mounted proximate to one of the vents to increase the flow of air through the housing, the at least one fan being powered by DC power from the DC bus.

* * * * *